Patented July 28, 1942

2,291,520

UNITED STATES PATENT OFFICE 2,291,520

METHOD OF PURIFYING ZINC CONCENTRATES

Carl O. Anderson, Baxter Springs, Kans., Rudolph J. Stengl, Rosiclare, Ill., and Frederick C. Abbott, Tulsa, Okla., assignors to Mahoning Mining Company, Youngstown, Ohio, a corporation of Delaware No Drawing. Application October 30, 1941, Serial No. 417,116

6 Claims. (Cl. 75—1)

This invention relates to the purification of zinc sulfide, or sphalerite, and especially to a novel method of freeing zinc sulfide flotation concentrates or the like from fluorine-bearing contaminants to thereby render the concentrates suitable for use in zinc smelting plants and their sulfur content available for the manufacture of sulfuric acid.

Fluorspar is objectionable in zinc concentrates because its fluorine content is driven off during the roasting, sintering, and perhaps in the retorting (smelting), usually as hydrogen fluoride (HF), and readily attacks the smelter refractories and other parts even when only a very small amount is present and so in time seriously damages the apparatus, while the gases driven off during roasting and sintering cannot be used for making sulfuric acid if they contain even slight amounts of fluorine compounds.

Another objection to the use of zinc concentrates containing fluorspar is that in many communities the liberation of fluorine-bearing gases is prohibited by law and/or regulations of public authorities and the smelters must therefore make some provision for eliminating any fluorine content before discharging gaseous smelter wastes into the atmosphere.

Consequently, most smelters, even though not engaged in sulfuric acid manufacture, refuse to accept concentrates containing appreciable fluorspar, while those who will accept concentrates containing up to possibly 1% of it generally exact penalties in the form of lower prices to the concentrate producers.

It has therefore been extremely difficult to successfully commercialize certain large deposits of fluorine-bearing sphalerite, such, for example, as those in the Cave-In Rock district of Southern Illinois, where ores relative rich in zinc sulfide occur in fairly large quantities, since because of the fluorspar in the ore the zinc concentrates produced therefrom cannot be entirely freed of it by flotation and there has been no commercially satisfactory way of otherwise eliminating it.

We are familiar with the method of removing fluorspar from zinc concentrates described and claimed in U. S. Patent 2,137,600, issued November 22, 1938, to F. C. Abbott et al., but have found in practice that this method, while effective to reduce the fluorspar content of the concentrates to small fractions of 1%, is a slow process and not fully effective to remove all, or all but an imperceptible trace, of the fluorine unless prolonged for uneconomic periods of time. Therefore, although capable of giving good results apart from the questions of time and operating convenience, the said method has not entirely solved the problem from a commercial standpoint.

The present invention is accordingly directed to the complete elimination of all perceptible traces of fluorine from zinc concentrates and the like and is especially concerned with the provision of an industrially acceptable method of purification to render them suitable for use in zinc smelters and innocuous to sulfuric acid manufacturing units associated therewith.

It is, consequently, a principal object of the invention to provide a novel method for producing fluorine-free zinc sulfide from concentrates derived from raw or native sphalerite ores which are contaminated with fluorspar.

Another object of the invention is the provision of a method for treating zinc sulfide concentrates to eliminate contained fluorspar in a relatively short time and with a minimum of labor and reagent expense whereby fluorine-free zinc sulfide competitive with that obtained from ores devoid of fluorspar can be produced from sphalerite-fluorspar ores.

A further object is the provision of a method of freeing zinc sulfide concentrates from fluorine by treating them with sulfuric acid in the presence of an aluminum-bearing compound.

Other objects, purposes and advantages of the invention will be understood by or be apparent to those skilled in the art as the following description of it proceeds.

While the invention may be advantageously utilized to treat directly a flotation froth containing fluorspar-contaminated zinc sulfide concentrates, it will be understood any similarly contaminated zinc sulfide ore in relatively finely divided condition can be treated with equal facility and, consequently, by the use herein of the term "concentrates" we intend to include the latter however derived. Zinc sulfide flotation froths usually come from the flotation circuit at a density of about 40% solids and to condition them for the treatment such froths are desirably thickened in a suitable settling tank or the like to a density of about 55–65% solids, while if a dry ore is used approximately two-thirds of its weight of water is added to produce a pulp of suitable consistency.

In accordance with the invention, the thickened froth or pulp constituting a slurry containing about 60% solids, is first mildly heated, preferably to a temperature of about 50°–90° C. which yields optimum results from the standpoint of speed of reaction and other factors, and after, or if preferred during, the initial heating, about 100 pounds of concentrated sulfuric acid (66° Bé.) per ton of dry concentrates and a predetermined quantity of a suitable aluminum-bearing compound, such as alumina or bauxite, are added to and thoroughly mixed with the warm slurry. When refined alumina, aluminum chloride, aluminum sulfate or the like is used as the aluminum-bearing ingredient a slight excess over stoichiometrical equivalency to the fluorspar present is employed, but when using raw or crude bauxite we prefer a considerably greater excess, running up to about 50 pounds per ton of dry concentrates when the latter contain not more than about 1% $CaF_2$.

The mass of slurry, acid, and aluminum-bearing compound is kept in constant motion until the reaction of the several ingredients goes to completion, heat being supplied in any convenient way to keep the temperature substantially constant. Thus with the aid of a steam jacket on one conduit connecting a circulating pump with the reaction receptacle or tank we can readily provide both the heat and the agitation desired.

Usually the reaction is complete after about one or two hours or less as indicated by the entire decomposition of the calcium fluoride and it is ordinarily unnecessary to continue it for longer than two hours. Whether or not it is completed at any time, however, can easily be ascertained by analyzing a washed sample of the solids to determine if it contains any perceptible fluorine; if it does not, the reaction is complete and the mass consequently ready for further treatment.

It is, therefore, removed from the reaction tank and, particularly if corrosion-resistant filtering means are not readily available, is preferably diluted with water and thickened by settling once or twice before subjecting it to the succeeding filtering operation. The overflow discharged from the thickener carries off a large proportion of the excess acid and a substantial proportion of the fluorine content of the ore in solution and corrosion by these agents of apparatus used later in the method is thereby prevented. Excess acid remaining in the underflow or thickened mass may then be neutralized with soda ash, calcium hydrate, or other relatively harmless alkali capable of reacting with the residual acid to produce soluble or innocuous products only, and the neutralized slurry is next filtered, conveniently at the ordinary temperature at which it usually reaches the filter. The solid material or filter cake deposited on the filter is washed with water and then, if necessary, with a weak alkali solution to insure complete neutralization of all traces of acidic residue before it is removed from the filter and dried preparatory to delivery to smelters or other users as fluorine-free zinc concentrate.

The filtrate or waste liquor from the filter and the overflow from the thickener contain both aluminum and fluorine values and under some conditions it may be desirable to recover them, but we have found this unessential to the economic practice of our method as the cost of operating it is fully met by the increased value of the purified zinc concentrates produced; the filtrate and thickener overflow will thus usually be retained only when they can be advantageously utilized in some way or treated to recover their contained values at a profit.

In the practice of our method certain chemical reactions occur the precise nature of which is not fully understood and they are not at present susceptible of being set forth with absolute certainty. The reaction stated below in equation form, however, is believed to be the sum or result of several intermediate reactions which together apparently account for the complete conversion of the fluorine content of the ore to soluble form, making possible its removal in solution when either alumina (aluminum oxide, $Al_2O_3$) or its practical equivalent for chemical purposes, bauxite (which consists essentially of aluminum oxide ($Al_2O_3$) and water) is used.

$$3CaF_2 + 3H_2SO_4 + Al_2O_3 = 2AlF_3 + 3CaSO_4 + 3H_2O$$

This reaction results in the production of a certain amount of calcium sulfate ($CaSO_4$) and a little more of it may result from reaction of some of the excess sulfuric acid with the small amount of calcite ($CaCO_3$) often present in the feed, and/or with calcium hydrate ($Ca(OH)_2$) when it is used just prior to filtering for neutralizing any remaining residual acid.

But calcium sulfate formed in this way is probably in the hydrated state as gypsum ($CaSO_4.2H_2O$) and its solubility is usually sufficient and its occurrence is in such minor quantities that it does not become a significant impurity in the end product. That is, all the calcium present, whether in fluorspar, in calcite, or in calcium hydrate, is theoretically converted to the slightly soluble calcium sulfate or gypsum, but most of it is removed in solution or in suspension in the large quantities of water comprised in the thickener overflow and in the filtrate and wash water; the minute amount of it which remains in the filter cake is consequently so small it can be disregarded.

It is important to note, however, that the fluorine content of the concentrates, which by customary flotation methods can be and usually is kept below about 0.49% (1.0% $CaF_2$), and is desirably never permitted to exceed about 1.22% (2.5% $CaF_2$) in concentrates intended for treatment by our method, is entirely converted to a soluble compound which is identified in the above equation as aluminum fluoride ($AlF_3$). This material is so soluble that it is readily removed in solution during the course of the treatment and while it is formed in the presence of zinc sulfide and an excess of sulfuric acid, such removal is not accompanied by loss of appreciable quantities of the zinc content of the concentrates.

It is our present belief this may be due to the fluorspar being first rapidly decomposed by the sulfuric acid and the fluorine ion thus released then reacts with the alumina, with the aluminum content of the bauxite, or with whatever other aluminum-bearing material is used, to produce the soluble aluminum fluoride ($AlF_3$) rather than attacking the zinc sulfide directly or, after combining with hydrogen, as hydrofluoric acid, while the calcium released from the fluorspar tends to neutralize in part the excess sulfuric acid so that neither the latter nor the fluorine ion can attack the zinc sulfide to any appreciable extent. This hypothesis would largely account for the absence of material decomposition of the zinc sulfide and/or zinc losses which often occur to a distinctly significant degree in other methods involving the treatment of zinc sulfide in the presence of excess sulfuric acid, but it is possible some other conditions or reactions may account for the result.

It is also probable, moreover, particularly when bauxite is used as the aluminum-bearing compound, that some of the excess sulfuric acid reacts with it to produce alum ($Al_2(SO_4)_3$), and we therefore supply a substantial excess of the acid over the stoichiometric equivalent of the fluorspar present to enable this reaction to occur without impeding complete removal of the fluorspar.

If any such reaction of bauxite with the sulfuric acid takes place, it minimizes to a corresponding extent the residual acidity which might otherwise result from the presence of the excess acid and thus not only possibly prevents it from attacking the zinc sulfide but also incidentally may facilitate the subsequent diluting and neutralizing steps, if they are employed, so we ordinarily supply more bauxite than the amount equivalent to the fluorspar present to allow for this condition.

Other reactions than the ones we have herein described also probably occur during the practice of our method but while we are able to describe the results, as above noted we are not prepared to state with positive certainty precisely what such reactions may be or even that those to which we have referred invariably take place.

Accordingly, it may be considered our method contemplates the treatment of zinc sulfide concentrates or generally similar relatively finely divided zinciferous minerals containing residual fluorspar contamination which preferably does not exceed 2.5% (about 1.22% fluorine), and that its principal steps include digesting the material in the presence of a substantial quantity of an aluminum-bearing compound and sulfuric acid in considerable excess over the stoichiometric equivalent of the fluorspar.

Inasmuch as this digesting step is attended by substantially all the essential chemical activity required to convert the fluorine to water soluble compounds, it will be evident that the subsequent steps, including diluting, in some instances followed by neutralization of excess acid and thickening, ultimate filtration, washing and drying of the filter cake, and disposal of the residual liquors, wash solutions and other fluids practically are all mechanical operations which can readily be carried out either as herein described or in some equivalent way, and further that the method may be practiced as either a "batch" or a continuous one as preferred.

It will now be apparent our invention permits the production from fluorspar-containing concentrates of fluorine-free zinc sulfide which is as acceptable to operators of zinc smelters and sulfuric acid plants as zinc sulfide produced from naturally fluorspar-free ores, and that the practice of the invention does not entail the use of extremely high temperatures, unduly prolonged reaction times, delicate balancing of reagents, or, save for the reaction apparatus itself, employment of acid proof equipment.

While the appended claims may refer in more or less specific terms to one or more of the several operations heretofore mentioned as incident to the practice of our method, it will be understood they may be changed and/or modified in their several details and that the relationships between the various steps comprised in the method may be adapted to suit the preferences or convenience of the operator without departing from the true spirit and scope of the invention as defined in the said claims.

Having thus described our invention, we claim and desire to protect by Letters Patent of the United States:

1. A method of freeing zinc sulfide concentrates of a fluorine content not in excess of about 1.25% present as calcium fluoride which comprises subjecting the concentrates at moderately elevated temperatures to the action of sulfuric acid in substantial excess of the stoichiometrical equivalent of the fluorine and in the presence of aluminum oxide in not less than the substantial stoichiometrical equivalent thereof for a time sufficient to decompose the calcium fluoride, and then separating the fluorine in water soluble form from the solid concentates.

2. A method of freeing zinc sulfide concentrates of a fluorine content not in excess of about 1.25% present as calcium fluoride which comprises subjecting the concentrates at moderately elevated temperatures to the action of sulfuric acid in a slurry containing approximately 60% solids and approximately 100 pounds of the acid per ton of dry concentrates in the presence of a sufficient quantity of an aluminum-bearing compound to provide aluminum in stoichiometric equivalency to the fluorine in the concentrates, maintaining the slurry at a moderately elevated temperature less than 100° C. for a time sufficient to effect complete decomposition of the calcium fluoride, then separating the liquid from the solids and washing the latter to thereby remove therefrom in solution the fluorine content of said fluoride.

3. A method of purifying finely divided fluorspar-bearing zinc sulfide comprising the steps of mixing with a water pulp of the sulfide about 100 pounds of sulfuric acid and up to about 50 pounds of bauxite per ton of the dry sulfide, maintaining the mixture at a moderately elevated temperature until conversion of the fluorine content of the fluospar to relatively highly soluble compounds and then separating said soluble compounds in solution from the undissolved sulfide.

4. The method of removing fluorine from zinc sulfide concentrates containing calcium fluoride in quantity not substantially in excess of 2.5% which comprises digesting the concentrates in water with sulfuric acid in substantial excess and an aluminum-bearing compound in relatively small excess of the respective stoichiometric equivalents of the calcium fluoride present in the concentrates while supplying heat to the mass to maintain its temperature from about 50° C. to about 90° C. for a time of the order of one to four hours to thereby fully decompose the fluoride and then filtering and washing the concentrates to remove the fluorine therefrom in solution.

5. In a method of purifying fluorspar-contaminated zinc concentrates, the steps of mixing with a water pulp of the concentrates containing about 60% solids, about 100 pounds of concentrated sulfuric acid per ton of dry solids in the pulp and a sufficient quantity of an aluminum-bearing compound to provide an appreciable excess of aluminum over the stoichiometrical equivalent of the fluorine present in the pulp and agitating the mixture at an elevated temperature not exceeding about 90° C.

6. In a method of purifying fluorspar-contaminated zinc concentrates, the steps of mixing with a water pulp of the concentrates containing about 60% solids, about 100 pounds of concentrated sulfuric acid and up to about 50 pounds of bauxite per ton of dry solids in the pulp and agitating the mixture while maintaining its temperature from about 50° C. to about 90° C.

CARL O. ANDERSON.
RUDOLPH J. STENGL.
FREDERICK C. ABBOTT.